United States Patent [19]
Goeser

[11] Patent Number: 6,138,088
[45] Date of Patent: Oct. 24, 2000

[54] METHOD AND APPARATUS FOR PROCESS CONTROL BY USING NATURAL LANGUAGE PROCESSING (NLP) TECHNOLOGY

[75] Inventor: Sebastian Goeser, Stuttgart, Germany

[73] Assignee: International Business Machines Corporation, Armonk, N.Y.

[21] Appl. No.: 08/995,442

[22] Filed: Dec. 22, 1997

[30] Foreign Application Priority Data

Feb. 19, 1997 [DE] Germany .................. 197 06 419

[51] Int. Cl.⁷ .................................. G06F 17/27
[52] U.S. Cl. .................... 704/9; 704/1; 705/7
[58] Field of Search ............ 704/1, 9, 10; 705/1, 705/7, 8, 9, 10, 11; 707/104, 100; 706/925

[56] References Cited

U.S. PATENT DOCUMENTS

| | | |
|---|---|---|
| 4,965,763 | 10/1990 | Zamora ........................... 704/1 |
| 5,444,615 | 8/1995 | Bennett et al. .................... 705/8 |
| 5,497,319 | 3/1996 | Chong et al. ..................... 704/2 |
| 5,535,120 | 7/1996 | Chong et al. ..................... 704/3 |
| 5,644,686 | 7/1997 | Hekmatpour ..................... 706/45 |
| 5,740,425 | 4/1998 | Povilus ......................... 707/100 |
| 5,826,239 | 10/1998 | Du et al. ......................... 705/8 |
| 5,878,398 | 3/1999 | Tokuda et al. ..................... 705/8 |
| 5,884,311 | 3/1999 | Blattmann-Bleile et al. ......... 707/10 |
| 6,038,538 | 3/2000 | Agrawal et al. .................... 705/7 |

*Primary Examiner*—Joseph Thomas
*Attorney, Agent, or Firm*—Robert P. Tassinari

[57] ABSTRACT

Natural language processing is used in a method and apparatus for the computer-backed control of business processes and process sequences. The method involves the automatic checking of at least one of the conditions of an activity of the business process using a method of natural language processing. Control of the process conditions of activities which currently checked by humans can be checked automatically.

16 Claims, 5 Drawing Sheets

METHOD AND APPARATUS FOR PROCESS CONTROL BY USING NATURAL LANGUAGE PROCESSING (NLP) TECHNOLOGY

TECHNICAL FIELD

The invention involves a method and apparatus for use of natural language processing technology for process control, in particular for the computer-supported control of business processes and process sequences.

BACKGROUND OF THE INVENTION

By natural language processing technology we mean technologies and methods for computer-based analysis and processing of natural language texts on the basis of linguistic models. By computer control of business processes we mean the use of a computer system which controls stages of a business process modelled and reproduced within the computer system in relation to specific conditions.

The present invention is suitable both for use in process control of processes in industrial production technology and plant technology as well as in process control of businesses in the services area. Such process control also involves the allocation of resources or materials. For example, it could be the allocation of components such as bolts to manufacturing machines and the automatic transport of the bolts to the manufacturing machines in the case of control of a production process. It also could be the allocation of computer capacity and memory capacity in a bulk translation processing memory for a service such as calculation of a bank credit.

STATE OF TECHNOLOGY

The continuing globalization of companies together with the need for rationalization of production processes results, to an increasing extent, in the need for reorganization of the processes, business processes and processing sequences in these companies with the aim of optimizing the use of the resources available. The term "Workflow management" is frequently used for computer control of business processes and process sequences. In what follows, the terms "Process", "Business process" and "process sequence" are regarded as synonymous.

In H. Heilmann: "Workflow Management: Integration von Organization und Informationsverarbeitung" (Workflow Management: Integration of Organization and Information Processing) HMD, 176, 1994, pages 8–21, a business process is described as a definable process, frequently a part of work, which results in the production or exploitation of business capacities. This definition places emphasis upon the dynamic sequence of the process from its initialization until it is concluded. Frequently also the term "Workflow" is employed in place of the term "Business Process".

The control or management of business processes involves the use of a computer system. In this computer system the model of the business process to be controlled is stored. In other words, the business process is reproduced in this computer system. For each passage of a business process which actually takes place, an image of this business process is created in the computer system and this business process which actually runs is controlled by means of the computer system.

Existing methods for the control of business processes are based upon more or less different models for the description of business processes and in particular they do not all use uniform terms, since in this relatively young technical discipline it has not yet been possible to establish a consistent nomenclature.

However, a common feature for all known methods and systems is that information is converted into digital data, and in cases where prescribed conditions are met such digital data starts specified activities, and these activities again result in production of data in digital form, which depict the regulating variables of the process to be controlled.

In F. Leymann and D. Roller: "Business Process Management with Flowmark", Digest of Papers, Cat. No. 94CH3414-0, Spring COMPCON 94, 1994, Pages 230–234, the IBM Flowmark Workflow Management System is described. Both the possibilities for modelling of business processes are presented and a description is given of the execution of Workflow Management. The IBM Flowmark product can be acquired via the normal IBM Deutschland sales outlets or from IBM Corporation.

The IBM Flowmark system is based upon a model for the description of business processes, where inter alia digital data are provided in what is known as input data containers. When a prescribed situation arises which is automatically checked by the computer system, these data start what is known as an activity forming part of the input data container. This activity again produces digital data, which by means of a data transfer are set either in what is known as the output data container of this activity or directly in the input data container of the next corresponding activity.

The process can be controlled in a wide variety of ways by the starting and execution of the activity. For example, to prevent bottlenecks in a production process one can start up an additional production plant automatically and put it into operation. If additional assembly components will be needed in the future to cope with a received order, they can be ordered by an electronics data line, and supplied by an industrial robot in order to prevent a stoppage of production.

In a service process, processes can be controlled in an entirely similar manner by the use of a "Workflow Management" system. For example, certain computer workplaces connected to a central computer to handle a service process, are provided with increased computer capacity because of a relevant process situation, or, as the result of an activity specified by programs they are automatically started, or specified data base accesses are automatically opened up. Further, the working memory of a specified computer workplace is automatically stocked in advance with digital data.

For the part of the description of the present invention which follows, for the sake of improved understanding we use exclusively the terminology known from the IBM Flowmark system. This does not indicate any restriction of the invention to a use within the IBM Flowmark system, since the invention can also be applied to other "Workflow Management" systems.

One field of application for natural language processing (Natural Language Processing—NLP or Computational Linguistics) is information extraction (Information Extraction—IE) which is concerned with computer-based processes for linguistic analysis and generation of natural language. Other fields of application for natural language processing, for example, would be machine translation (Machine Translation—MT), speech recognition and Information Retrieval—IR, which is concerned with searching of documents and the storage of large quantities of documents.

Among important methods of natural language processing there are inter alia syntactical methods, such as grammar unification processes; computer-semantic methods, such as the Discourse-Representation-Theory—DRT; and lexical methods, such as those based upon final automatic machines. In particular, statistical processes are also frequently used for information extraction and information retrieval.

IBMs Textmining technology combines a number of processes from the field of information retrieval and information extraction in order to give the user facility for content-orientated processing of documents. In particular, a retrieval model, as the central component, has grouped around it numerous processes for further processing of content in accordance with specific user requirements, such as the extraction of special samples of content.

The article by D. E. Appelt et al: "FASTUS: A Finite-state processor for information extraction from real-word text", Proceedings of IJCAI-93, Chambery, August 1993 p.1172–1178 describes as an example a system for extraction of pre-specified information from "natural" i.e. not previously processed text, in this case news agency reports. The information types of interest —in this case terrorist occurrences (attacks, kidnappings etc) in Latin America— are prespecified by a special type of content-based samples. These required information samples describe the nature of the event, for example the time, the instigators and victims in accordance with what is known as the slot/filler principle, frequently used in systems for information extraction. A slot is an open position of the sample, which can be filled by one or more extracted text components, the fillers. Using the input text, the entire sample is "paired", one or more fillers being allocated to each slot. The proportion of correctly filled slots is defined as a match. The matches indicated in the article provide proof of the effectiveness of the extraction process described.

With known methods for computer control of business processes, it is only possible to define initial conditions for starting of activities as Boolean functions on the data structures of the contents of the input containers. As a result, the process control is unable to process any information not capable of being represented as a term within a Boolean function for control of the process.

This has the disadvantage that in some applications it is not possible to distribute, in optimum form, the resources available, so that it is not possible to have optimum control of the process. As a result, the process costs can increase and the time taken for processing extended. Another disadvantage is that the process control is insufficiently flexible for some applications. For example, with the known systems and methods an initial condition of an activity cannot contain any parameters associated with the content of a document, say with the content of an order awarded or with the content of a letter received. With known systems and methods the association has to be created by a person who after reading the order or letter manually starts a corresponding activity or does not do so.

The disadvantage of this is that by involving the person to take the action a potential source of error is created within the process control.

OBJECTS OF THE INVENTION

Therefore an object of invention is to provide a method and apparatus for the control of processes, in particular for computer-backed control of business process sequences, which method and apparatus are flexible and reliable and which reduces the processing costs and the time taken.

Another object of the invention includes provision of a method and apparatus for computer-backed control of business processes and process sequences, which makes it possible at the stage of modelling of processes to associate initial conditions of activities with the contents of documents.

BRIEF DESCRIPTION OF THE INVENTION

An important aspect of the invention is using natural language processing technology within the business process control. Information in documents can be identified and if necessary extracted.

A further important aspect of the invention is that even at the modelling phase of the process initial conditions can be defined for activities which process such identified information.

The advantage of this is that human intervention is eliminated from the process control and further that such substitution of human intervention by an automated process is incorporated at the stage of modelling of the process.

Information, in the form of digital data identified by means of Textmining-technology and if necessary extracted, is automatically compared with the required information samples also stored in the computer system in the form of digital data. The overall extent of such samples is determined by the knowledge of terms in the individual area of application, i.e. by the special domain of the application.

According to the outcome of this comparison, the process is controlled by starting of allocated activities, the passing on and re-storage of digital data, the start of modems for the provision of a remote data link, or the putting into operation of additional production or computer equipment or by an appropriate distribution of the resources available.

This solution means that it is not only possible to have more flexible process control, but also to reduce the costs and processing times. As an example, in the case of a service process, resources are made available precisely at those computer workplaces where they are required with maximum priority to short processing time.

DETAILED DESCRIPTION

Figure 1:
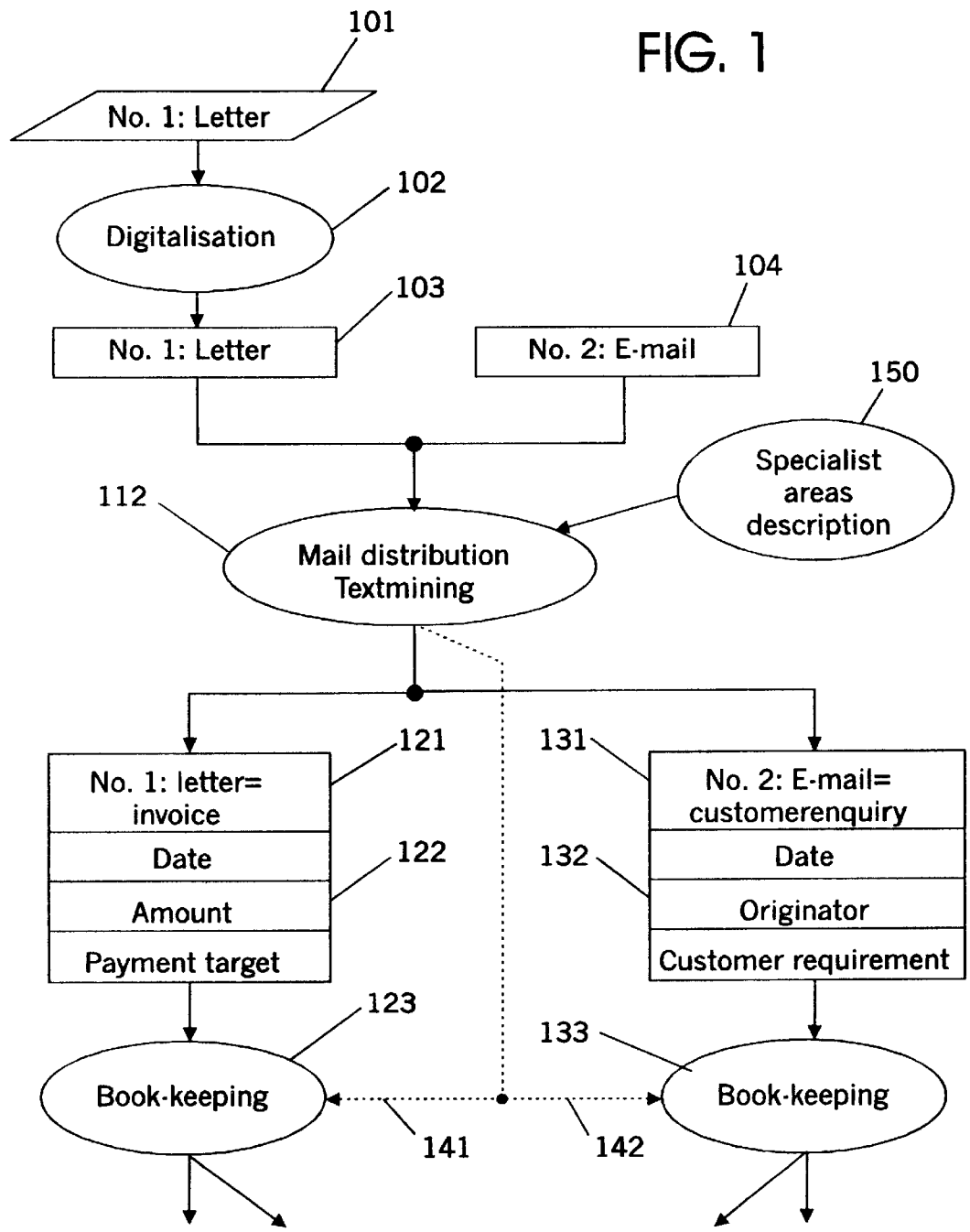
FIG. 1 Shows an extract from the sequence of the business process for dealing with incoming mail in a company in accordance with the present invention.

FIG. 1 shows an extract from the sequence of the business process for dealing with incoming mail in a company in accordance with the present invention.

The incoming mail contains all documents, communications and information received by the company, regardless of the individual appearance, in particular also conventional letters 101 in paper form, telephone conversations and electronically transmitted information.

If this incoming mail is already in digital form, say in the case of electronically transmitted e-mail 104, such digital data can be passed directly to the automatic post distribution unit 112.

If the incoming mail is not in digital form, say a letter 101 in paper form, it has to be digitalized by means of an intermediate stage of digitalization 102; but the letter 101 in paper form becomes a data file 103 of digital data, which represents the content of the letter. Conventional techniques and technologies are employed for digitalization, for example scanning of the letter with subsequent text recognition (Optical Character Recognition OCR).

Parallel with the incoming mail, the mail distribution unit 112 is supplied by a workflow administration unit with descriptions 150 for special areas. The total of such descriptions 150 for specialist areas can be seen as a domain-specific extractor in terms of the textmining process. These descriptions 150 specify the conditions under which the mail received 103,104 is allocated to specific subject areas, and what information may be extracted from the incoming mail.

By the application of a textmining process within the mail distribution unit 112, by assessment of the mail received with reference to the available descriptions of specialist areas, one determines those activities which have to be started within the overall process in order to deal with the mail received.

The output from the mail processing unit 112 consists of a list of descriptions of the mail documents received. Each element in this list of descriptions contains an identification 121, 131 of the mail document, a number of subject areas, covered by this mail document, a number of attribute value pairs 122, 132 which represent the information extracted from the mail document, and control information.

This control information corresponds to Boolean conditions of a number of output control connections 141, 142, which can start further activities within the overall process. To this extent these control connections represent the initial conditions of subsequent activities of the overall process. Since these control connections themselves represent the output from the automatic mail connection and consequently the output from the textmining process, the initial conditions of the subsequent activities are automatically checked by the use of the textmining process.

In the case depicted in FIG. 1, the letter 101 is an invoice to be forwarded to the book-keeping department. Consequently, the activity book-keeping 123 is started via an appropriate control connection 141. At the same time the extracted attributes 122 of date, amount and payment target are transmitted.

The e-mail 104 received is a customer enquiry. Therefore the activity customer service 133 is started via a corresponding control connection 142. At the same time the extracted attributes 132 date, originator and customer requirement are transmitted.

Further activities can follow the activities book-keeping 123 and customer service 133 within the overall process.

By starting the activity within the overall process to be controlled as the result of conditions of activities being met, conditions automatically being checked by means of textmining technology, control is exercised over the status of those work places in the computer at which the corresponding subsequent activity is to be involved. More precisely, the status conditions of this computer are controlled at an early stage by automatic checking of the conditions using textmining technology.

If, for example the automatic check reveals that the e-mail 104 received is a customer enquiry, the relevant document is not merely passed on to the corresponding work place computer within the customer service department by electronic means. In addition, a connection to the customer data base is also created, so that the specialist can check whether the person submitting the enquiry is already a customer or if it will be a new customer. In the case of comprehensive or distributed data bases this connection to the customer data base can also mean the involvement of a modem or provision of a remote data connection.

In a similar way a text processing program is started at the relevant work place computer, and this program is loaded into the working memory, so that the specialist can immediately compile the answer to the customer. Moreover, whereas specified activities involve a workplace computer which is connected to a central computer on which part of the work place computer operations are performed, a higher priority can be allocated on the central computer so that it is possible to handle particularly demanding process activities in a relatively short time.

Figure 2:
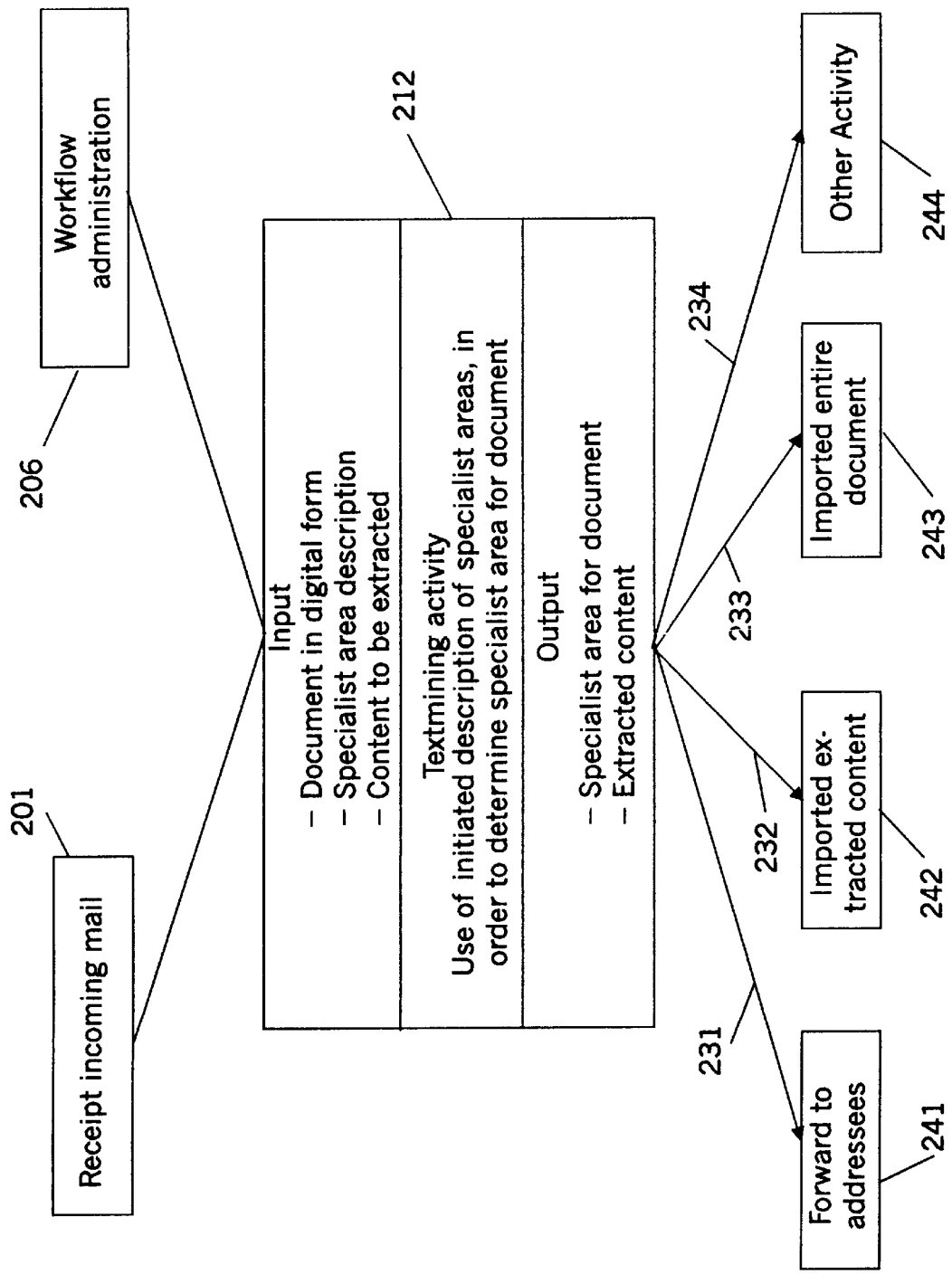
FIG. 2 shows the mail distribution 112 as in the invention of FIG. 1 in greater detail.

FIG. 2 shows the mail distribution 112 of FIG. 1 in more detail. Here the receipt of incoming mail 201 can be considered as a stand-alone activity. The textmining activity 212 is always activated when new mail arrives. In the present case the documents received should already be in digital form.

A further input of textmining activity 212 is input of workflow administration 206 which prescribes the specialist areas and determines what content is to be extracted from the incoming documents. The input of this workflow administration can also be made at irregular intervals, for example when the organization construction of the company has modified something, or if new products are manufactured and supplied by this company.

The output from the textmining activity 212 comprises, in addition to the list with document description with document identifications and lists of specialist areas and extracted contents in digital form, control information 231 to 234, which itself controls further activities within the overall process. Thus, for example, documents can be forwarded to the identified addressees 241, extracted contents can be imported into a memory 242, an entire document can be imported 243, or some other activity can be started 244.

In this version example, with the textmining activity 212 Directed Acyclic Graphs (Directed Acyclic Graphs,) DAGs can be used to identify the specialist area of the document, and if necessary to extract information from it. These Directed Acyclic Graphs (DAGs) are a functional representation of linguistic information. The DAGs are applied to the incoming mail documents staged (the stages in structured form containing the identified information). Staging can also be considered as document related specialization of the description of the specialist areas.

Figure 3:
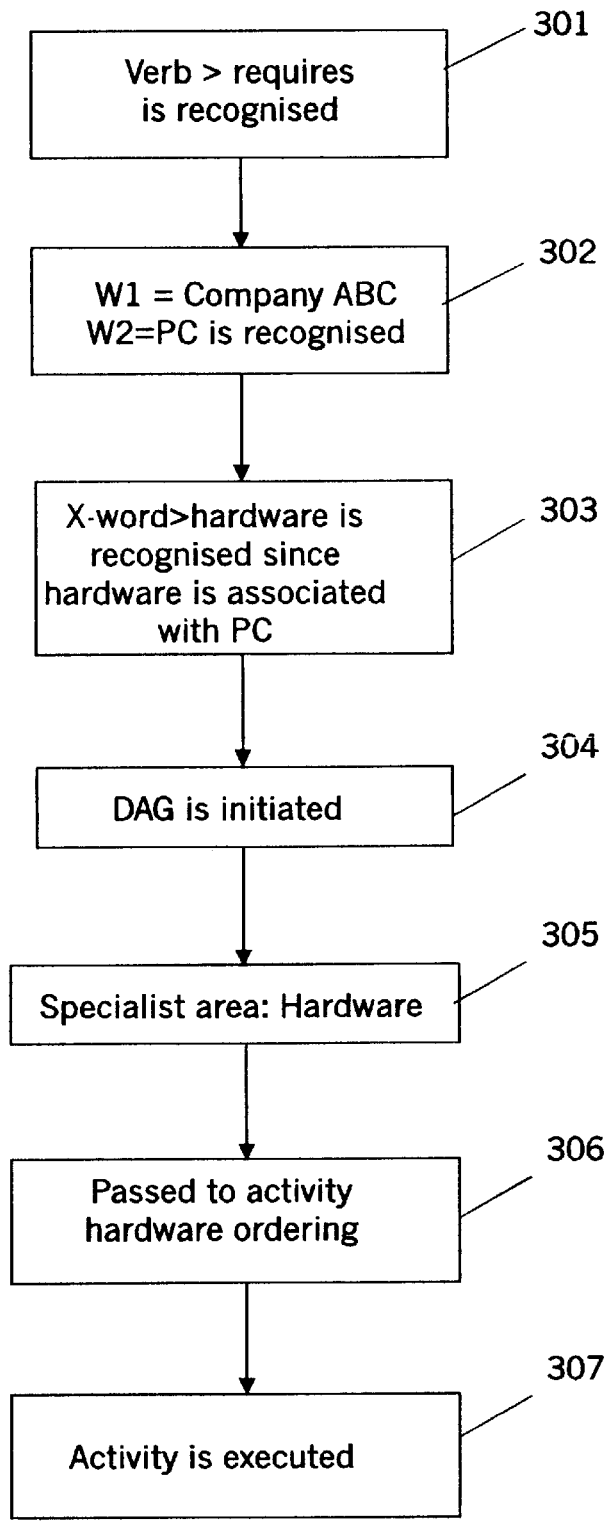
FIG. 3 shows a flowchart for the allocation of an incoming document.

FIG. 3 shows a flowchart for the allocation of an incoming document. The illustration shows how the sentence "Company ABC requires a PC" received with the arriving mail is allocated by the textmining activity to the specialist area "Hardware" prescribed by the workflow administration.

The first term identified is the verb "requires" 301. In accordance with the DAG which is underlying and is to be employed, a verb of this type requires the allocation of a subject word and an object word. "Company ABC" is recognized as the subject phrase W1 302. Likewise "PC" is recognized as the object phrase W2 -302. Recognition of the verb "requires" is the trigger pulse, initiating a search of any kind in this sentence for a subject and an object; to this extent the verb "requires" is the condition for "Company ABC" and "PC" to be recognized at all.

It is true that the recognized object "PC" is not identical with the prescribed specialist area description "Hardware";

"Hardware" is designated as the X-word. Consequently, a computer system is used to search for a relationship between "PC" and "Hardware" 303. Preferably this search is made by means of lexical information. If this search is successful, and a relationship is found, the DAG is operated 304. Therefore allocation 305 is made of the sentence to the specialist field "Hardware". A transfer 306 of the digital information is made to the corresponding activity, and this activity is executed 307.

FIG. 4 shows again in summary form the fundamental characteristics of the invention.

The business process to be controlled 400 has activities 410, 420 and 430 which in turn have data containers and relevant conditions 411, 412 and 421, 422 as well as 431 and 432. In accordance with the present invention these conditions are automatically checked by the computer system 450 controlling the business process, using a method of natural language processing 455.

Via data connections 413, 414 and 423, 424 as well as 433, 434 the computer system 450 reads the data containers 411, 412 and 421, 422 as well as 431, 432 of the activities 410, 420 and 430.

A preferred version of the invention checks in particular the initial conditions of the activities. Control of the activities 410, 420, 430 is carried out by means of corresponding control connections 415, 425 and 435. These activities can be executed both within a business premises or at different physical locations, and in particular the activities can also operate under worldwide distribution and outside the bounds of one company.

Both the data connections 413 to 415, 423 to 425 and 433 to 435 between the activities 410, 420 and 430 and the computer system 450 and also the data connections 401 to 407 between the individual activities 410, 420 and 430 can be executed as data connection by wire or without wire. Furthermore for the data connections one can use both local data networks and worldwide data networks, such as the Internet.

Figure 4:
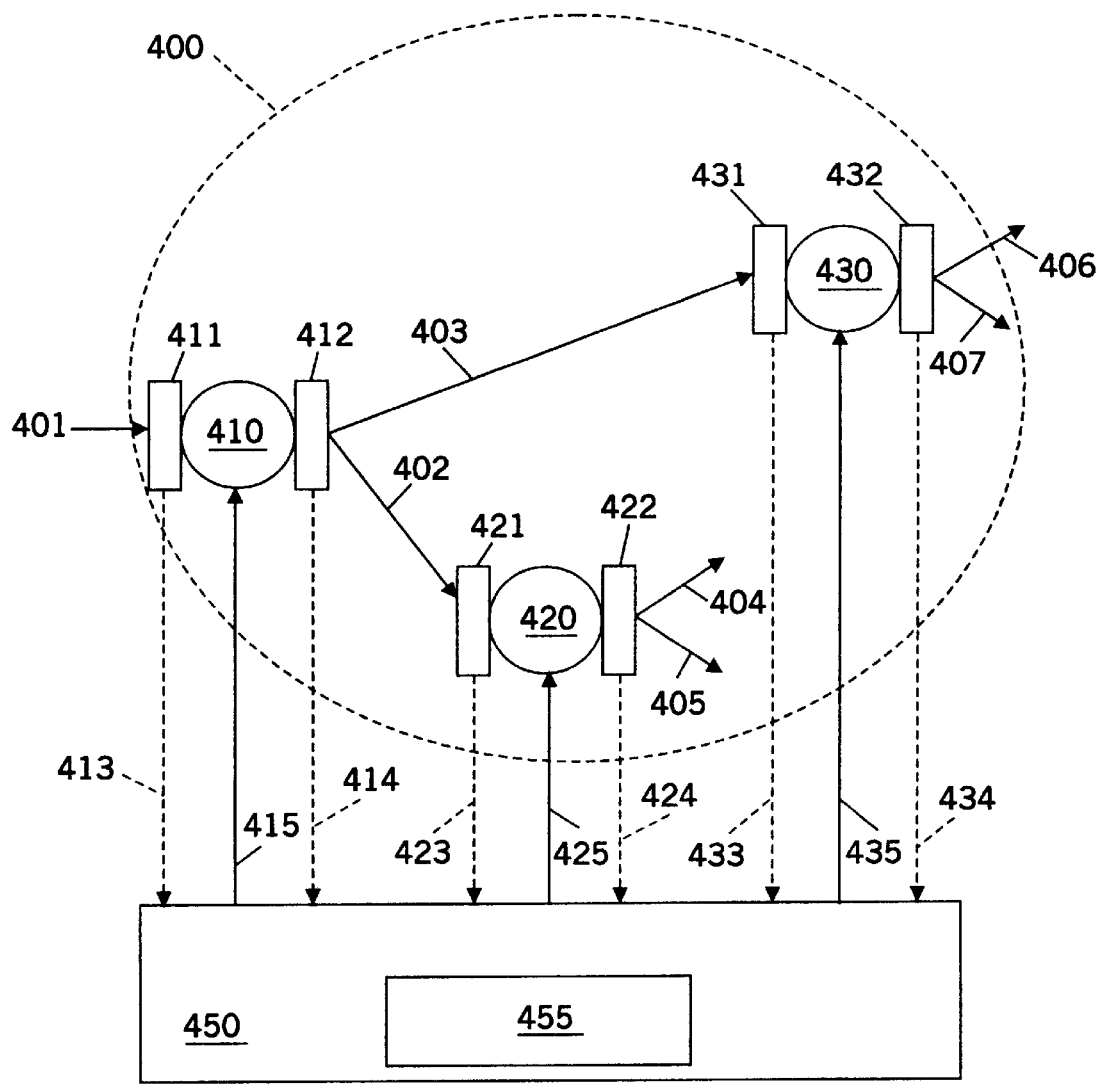
FIG. 4 gives a general view of the main features of the invention.

As depicted in FIG. 4, the controlling computer system can be in the form of a central computer 450. However the controlling computer system can also take the form of a decentralized or networked computer system. In particular, the control function can be executed close to the location of the activity or even immediately at the location of the activity; in the latter case, for example a first computer system 450a would be located at the location of the activity 410, a second computer system 450b would be located at the location of the activity 420 and a third computer system 450c would be located at the location of the activity 430 with the three computer systems 450a, 450b and 450c either operating independently of each other or networked with each other.

Figure 5:
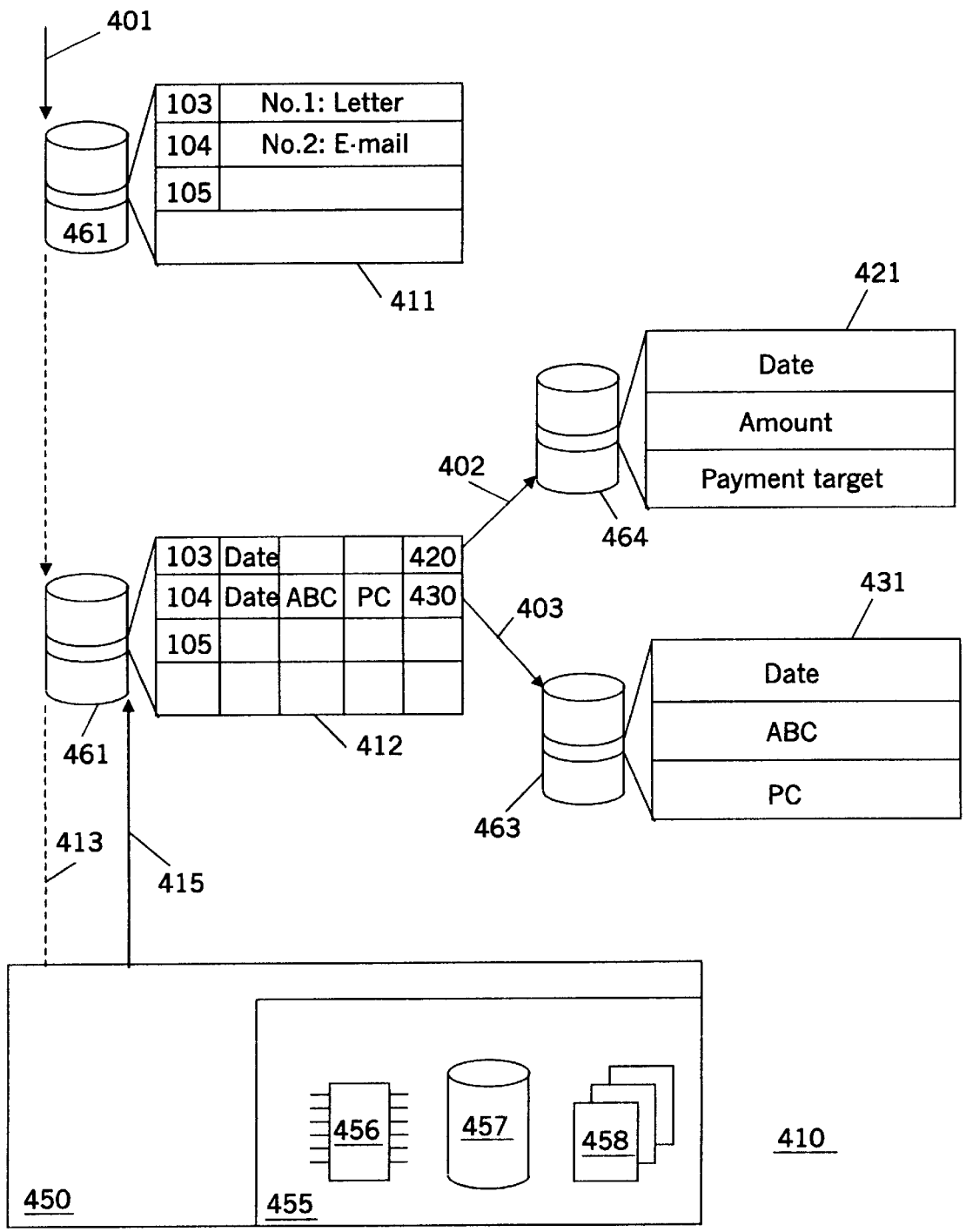
FIG. 5 shows the sample version of the distribution of mail in FIGS. 1 to 3 in a representation adapted to FIG. 4.

FIG. 5 shows an example of the mail distribution in FIGS. 1 to 3 in a representation adapted to FIG. 4.

Documents coming in via the channel 401 are stored in digital form in the input data container 411 of the activity mail distribution 112, 410. The input data container 411 corresponds to a memory area on a conventional data storage medium of a computer system, for example a hard disc 461. In the example depicted the incoming documents are a letter 103 and e-mail 104 and other documents 105 to follow.

The content of the input data container 411 is read into the computer system 450 via the data connection 413. Using a method of natural language processing 455 with information technology facilities, in particular processor facilities 456 and storage facilities 457, together with a corresponding computer program 458 stored in the storage facilities, the relevant information in the documents is identified and extracted from the documents. The extracted contents 122, 132 are again prepared in digital form together with an identification 103, 104 in the output data container 412 of the activity 410. The output data container 412 corresponds to a memory area on a conventional data storage medium of a computer system, such as a hard disc 462.

As an example from the e-mail 104 received the contents: date "DATE", originator "ABC" and customer requirement "PC" are extracted. In accordance with the description of the specialist areas 150 it is specified by the computer system 450 that such data has to be forwarded to the activity HARDWARE ORDERING 430. Consequently this data is set into the input data container 431 of the activity HARDWARE ORDERING 430 via the data connection 403. The input container 431 corresponds to a memory area on a conventional data storage medium of a computer system, such as a hard disc 463.

The extracted content of the letter 103 which is an invoice is allocated to the activity BOOK-KEEPING 420 in accordance with the description of the specialist areas 150, and the corresponding data is then set into the input data container 421 of the activity BOOK-KEEPING 420 via the data connection 402. The input data container 421 corresponds to a memory area on a conventional data storage medium of a computer system, such as a hard disc 464.

By the application of the information technology method to natural language processing 455 the conditions for starting the activities HARDWARE ORDERING 430 or BOOK-KEEPING 420, i.e. the receipt of an order or receipt of an invoice, are automatically checked.

The above described embodiment of the invention is for the field of control of service processes. However, the present invention in appropriate form can also be applied to the control of general processes and in particular also to control of production processes. Therefore it should be understood that the embodiments described herein have been provided by way of example and not by way of limitation. Many modifications which will not depart from the scope and spirit of the appended claims will be apparent to those skilled in the art.

What is claimed is:

1. A method for control of documents of a business process using a computer system, in which the business process has activities, and the activities have conditions, characterized by automatic checking of a document for at least one of the conditions using a method of natural language processing in which:
the automatic checking is performed automatically using the computer system by allocation of the document to a description,
the document has at least one word, which exists in the computer system in digital form,
functional descriptions of linguistic information in the form of directed acyclic graphs are stored in the computer system;
the directed acyclic graphs belonging to the descriptions are applied to the documents;
the acyclic graph relating to the document are initiated by means of a parsing process; and
the functional description contains at least one address to which the documents are forwarded.

2. The method of claim 1 in which the document is a letter received by a company; and the descriptions are allocated to various specialist areas of the company.

3. The method as in one of claim 2, which automatic checking takes the form of an independent activity within the control of the business process.

4. The method of claim 3, in which the computer system for control of the business process contains an IBM Flowmark workflow management system.

5. A computerized method of controlling the flow of documents through a business process comprising:

a) providing the documents in digital form to a computer system containing a model of a business process to be controlled by the computer system;

b) textmining the digitized documents using natural language processing to extract content from the digitized documents based on information stored in a workflow administrator of the business process; and c) automatically comparing specialist descriptions in the form of directed acyclic graphs of a plurality of work areas involved in the business process to the extracted content of the digitized documents using a parsing process to direct the documents to at least one specific work area out of said plurality and using the extracted contents for performing functions called for by the modeled business process at the at least one specific work area.

6. The method of claim 5 wherein the modeled business process is a model for handling of letters received by a company and the specialist descriptions are of different specialist areas of the company involved in the handling of business areas.

7. The method of claim 6 wherein the specialist areas of the company include customer service and bookkeeping areas of the company.

8. The method of claim 7 including the steps of identifying a product that is ordered from the extracted content and directing the order to the correct customer service area to fill the order.

9. The method of claim 5 including the step of using the extracted content for starting the at least one specific work area.

10. A software program on a computer usable medium providing a computerized method of controlling the flow of documents through a business process comprising:

a) modeling software containing a model of a business process to be controlled by the computer system;

b) workflow administration software defining what information is to be extracted from the document;

c) textmining software to analyze digitized documents using natural language processing to extract content from the digitized documents called for by the workflow administrator;

d) specialist software specifying specialist descriptions in the form of directed acyclic graphs to compare with the extracted content in a parsing process to direct the document to at least one of a plurality of different specific work areas involved in the business process;

e) operative software for using the extracted content in the performing functions at the at least one of the different specific work areas called for by the modeled business process.

11. The program of claim 10 wherein the modeling software for the business process is a model for handling of letters received by a company and the specialist descriptions in the specialist hardware are of different specialist areas of the company involved in handling those letters.

12. The method of claim 11 wherein the specialist areas in the specialist software include customer service and bookkeeping areas of the business process.

13. The software of claim 11 including product identification software for using the extracted content of a letter to identify a product that is ordered by the letter and to direct the order to the correct customer service area to fill the order.

14. A computer system for controlling the flow of documents through a business process comprising:

a) means for providing the documents in digital form to a computer system containing a model of a business process to be controlled by the computer system;

b) workflow administration means for defining what information is to be extracted from the documents;

c) textmining means for analyzing the digitized documents using natural language processing to extract content from the digitized documents called for by the workflow administration means;

d) specialist means for specifying specialist descriptions in the form of directed acyclic graphs to automatically compare with the extracted content using a parsing process to direct the document to at least one of a plurality of different specific work areas involved in the business process;

e) operative means for performing functions called for by the modeled business process at the at least one of the plurality of different specific work areas using information extracted from the documents.

15. The method of claim 14 wherein the business process is a model for the handling of letters received by a company and the specialist descriptions are of different specialist areas of the company.

16. The method of claim 15 wherein the specialist areas of the company include customer service and bookkeeping areas of the business.

* * * * *